United States Patent
Lee

(10) Patent No.: US 9,272,597 B2
(45) Date of Patent: Mar. 1, 2016

(54) AIR SUSPENSION SYSTEM AND CONTROL METHOD THEREOF

(71) Applicant: HYUNDAI MOBIS CO., LTD., Seoul (KR)

(72) Inventor: Seung Chul Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/327,309

(22) Filed: Jul. 9, 2014

(65) Prior Publication Data

US 2015/0105977 A1    Apr. 16, 2015

(30) Foreign Application Priority Data

Oct. 10, 2013  (KR) .................. 10-2013-0120665

(51) Int. Cl.
```
B60G 17/017    (2006.01)
B60G 17/015    (2006.01)
B60G 11/27     (2006.01)
B60G 17/0185   (2006.01)
B60G 17/08     (2006.01)
```

(52) U.S. Cl.
CPC .............. *B60G 17/017* (2013.01); *B60G 11/27* (2013.01); *B60G 17/0155* (2013.01); *B60G 17/0185* (2013.01); *B60G 17/08* (2013.01); *B60G 2202/152* (2013.01); *B60G 2400/051* (2013.01); *B60G 2400/204* (2013.01); *B60G 2400/252* (2013.01); *B60G 2400/52* (2013.01); *B60G 2600/08* (2013.01); *B60G 2800/80* (2013.01)

(58) Field of Classification Search
CPC .......................... B60G 17/017; B60G 17/0155
USPC .......................................................... 701/37
See application file for complete search history.

(56) References Cited

U.S. PATENT DOCUMENTS

2012/0046827 A1*  2/2012  Larkins et al. .................. 701/37

FOREIGN PATENT DOCUMENTS

DE        198 40 756 A1    3/2000
DE     10 2004 039 992 A1  2/2006

* cited by examiner

*Primary Examiner* — Maceeh Anwari

(57) ABSTRACT

Disclosed is a control method of an air suspension system includes: sensing an error of a tire or an air spring; and controlling the height of a peripheral air spring based on the tire or the air spring in which the error occurs.

17 Claims, 3 Drawing Sheets

AIR SUSPENSION SYSTEM AND CONTROL METHOD THEREOF

CROSS-REFERENCE TO RELATED APPLICATIONS

This application claims priority to and the benefit of Korean Patent Application No. 10-2013-0120665 filed in the Korean Intellectual Property Office on Oct. 10, 2013, the entire contents of which are incorporated herein by reference.

TECHNICAL FIELD

The present invention relates to an air suspension system and a control method thereof, and more particularly, to an air suspension system and a control method thereof that can facilitate a replacing or repairing operation by controlling the height of an air spring when replacement or repairing is required due to occurrence of errors such as a puncture in a tire of a vehicle, and the like.

BACKGROUND ART

In general, a suspension is a device that prevents vibration or shock which a vehicle shaft receives from a road surface from being directly transferred to a vehicle body to prevent the vehicle body or freight from being damaged and improve ride comfort when a vehicle is driven by connecting the vehicle shaft and a vehicle body.

In particular, an air suspension system includes an air spring, an air tank, an air supply unit (an air compressor and a solenoid valve), and a controller and sensors controlling the same.

The air suspension system is configured in such a manner that when a load decreases and a vehicle height thus increases, the solenoid valve (leveling valve) operates, and as a result, air in the air spring is discharged and when the load increases and the vehicle height thus decreases, the air is replenished in the tank to constantly maintain the vehicle height. Therefore, when the load increases, the spring becomes hard and when the load decreases, the spring becomes soft.

As described above, the air suspension system provides an automatic leveling function in order to maintain a predetermined vehicle height in modes by providing various modes.

Meanwhile, when an error occurs in the tire or the air spring of the vehicle, a jack is inserted between the road surface and a narrow space of the vehicle body to raise the vehicle body at a predetermined height for replacement or repairing.

The replacing and repairing operations become operations which are difficult and hard for a driver.

In order to solve such a problem, development of a system that can facilitate the replacing or repairing operation is required by controlling the height of the vehicle body by using the air suspension.

SUMMARY OF THE INVENTION

The present invention has been made in an effort to provide an air suspension system that can facilitate a replacing or repairing operation by controlling the height of an air spring when replacement or repairing is required due to occurrence of errors such as a puncture in a tire of a vehicle, and a control method thereof.

An exemplary embodiment of the present invention provides a control method of an air suspension system, including: sensing an error of a tire or an air spring; and controlling the height of a peripheral air spring based on the tire or the air spring in which the error occurs.

The sensing of the error of the tire or air spring may include comparing pressures of respective tires or air springs.

The sensing of the error of the tire or air spring may include comparing vehicle height output values of respective wheels; and sensing an inclination of a vehicle.

The method may further include, after the sensing of the error of the tire or air spring, judging a condition for controlling a vehicle height.

In the judging of the condition for controlling the vehicle height, it may be judged whether a vehicle stopping state is continued for a predetermined time.

In the judging of the condition for controlling the vehicle height, it may be judged whether an execution signal by an operation by a driver is input.

In the controlling of the height of the peripheral air spring based on the tire or the air spring in which the error occurs, the heights of air springs provided in two neighboring tires other than a diagonal tire based on the tire or air spring in which the error occurs may be increased.

Another exemplary embodiment of the present invention provides an air suspension system, including: a sensor unit sensing an error of a tire; and a controller controlling the height of a peripheral air spring based on a tire in which the error is sensed from the sensor unit.

The sensor unit may include a TPMS sensor measuring a tire pressure.

The sensor unit may include a vehicle height sensor provided in each wheel to measure a vehicle height; and a G sensor sensing an inclination of a vehicle.

The controller may increase the height of an air spring of a neighboring wheel based on a tire in which an error is sensed when a vehicle stopping state is continued for a predetermined time after the tire error is sensed.

The controller may increase the height of the air spring of the neighboring wheel based on the tire in which the error is sensed when an execution signal by an operation by a driver is input after the tire error is sensed.

According to exemplary embodiments of the present invention, an air suspension system and a control method thereof can facilitate a replacing or repairing operation by controlling the height of an air spring when replacement or repairing is required due to occurrence of errors such as a puncture in a tire of a vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
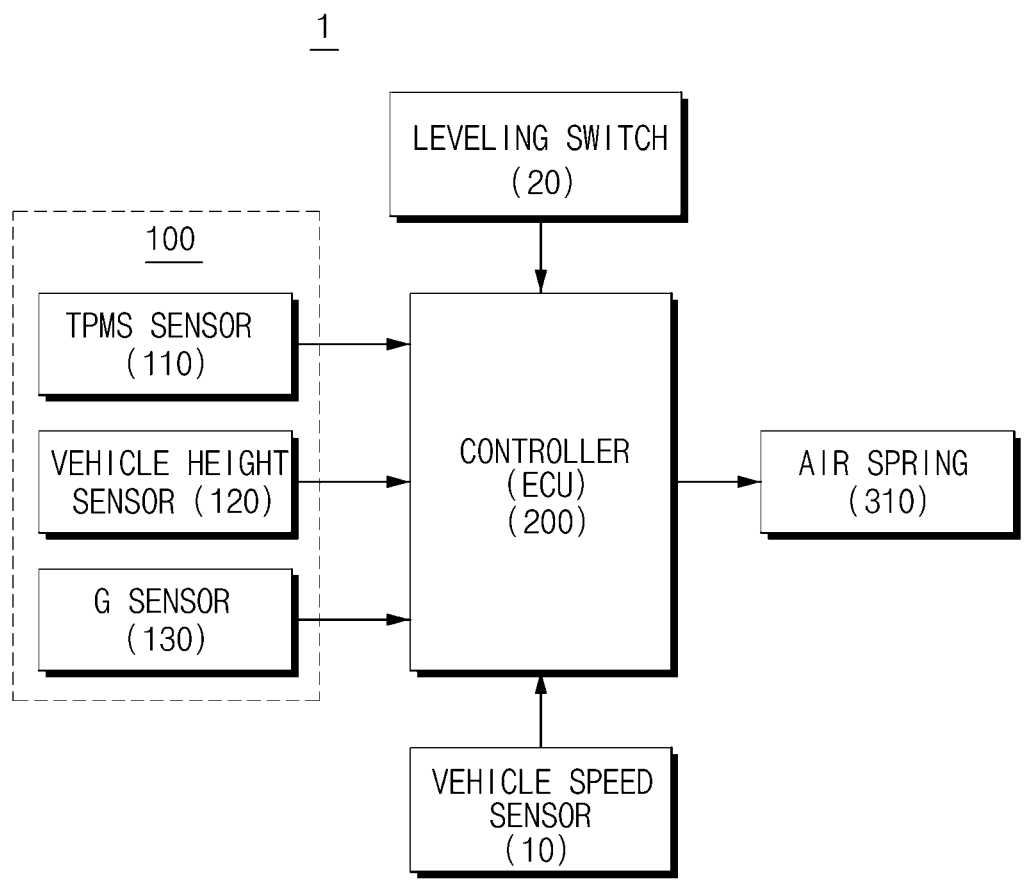
FIG. 1 is a block diagram illustrating a configuration of an air suspension system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. When reference numerals refer to components of each drawing, it is to be noted that although the same components are illustrated in different drawings, the same components are denoted by the same reference numerals as possible. Hereinafter, exemplary embodiment of the present invention will be described. However, it should be understood that a technical spirit of the invention is not limited to the specific embodiments, but may be changed or modified by those skilled in the art.

FIG. 1 is a block diagram illustrating a configuration of an air suspension system according to an exemplary embodiment of the present invention.

Referring to FIG. 1, the air suspension system 1 according to the exemplary embodiment of the present invention includes a sensor unit 100 sensing an error of a tire and a controller 200 controlling the height of a peripheral air spring 310 based on the tire of which the error is sensed from the sensor unit 100.

The sensor unit 100 senses the tire of which an error occurs when an error such as a puncture, and the like occurs in the tire.

The sensor unit 100 includes a TPMS sensor 110 measuring a tire pressure, a vehicle height sensor 120 provided in each wheel to measure a vehicle height, and a G sensor 130 sensing an inclination of the vehicle.

The TPMS sensor 110 measures a pressure of the tire and transmits the measured pressure to the controller 200 to notify the controller 200 of a tire in which a pressure error occurs.

The vehicle height sensor 120 is provided in each wheel to transmit the height of the vehicle to the controller 200 at each position.

The G sensor 130 measures the inclination of the vehicle and transmits the measured inclination to the controller 200.

Each sensor included in the sensor unit 100 transmits each measurement signal to the controller 200 so as for the controller 200 to recognize the tire in which the error occurs when the error such as the puncture, and the like occurs in the tire.

In this case, a vehicle without the TPMS sensor 110 may sense the tire in which the error occurs only by the vehicle height sensor 120 and the G sensor 130.

The controller 200 controls the height of the air spring 310 of a neighboring wheel based on the tire in which the error occurs when the tire error is sensed from the measurement signal of the sensor unit 100. In detail, the controller 200 increases the heights of the air springs 310 provided in two neighboring tires other than a diagonal tire based on the tire in which the error occurs.

Figure 3:
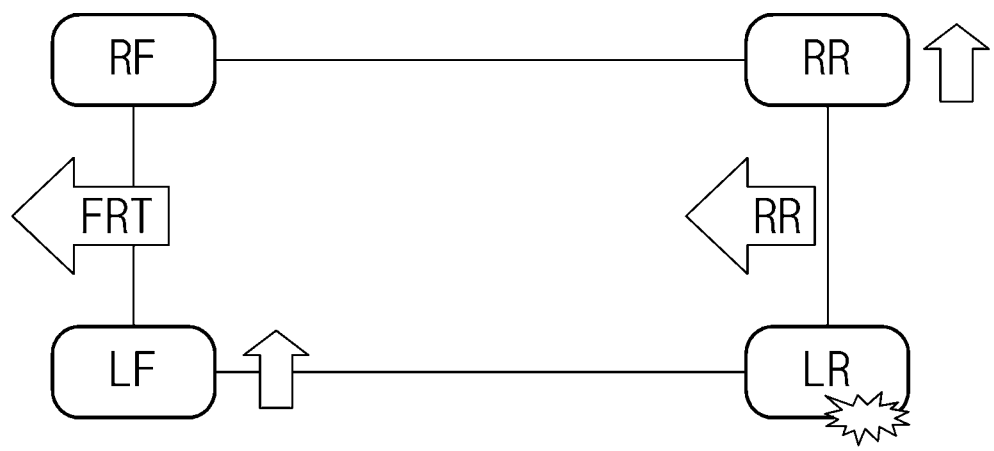
FIGS. 3 and 4 are diagrams describing a scheme of controlling the height of a vehicle body depending on the position of a tire in which an error occurs.
Figure 4:
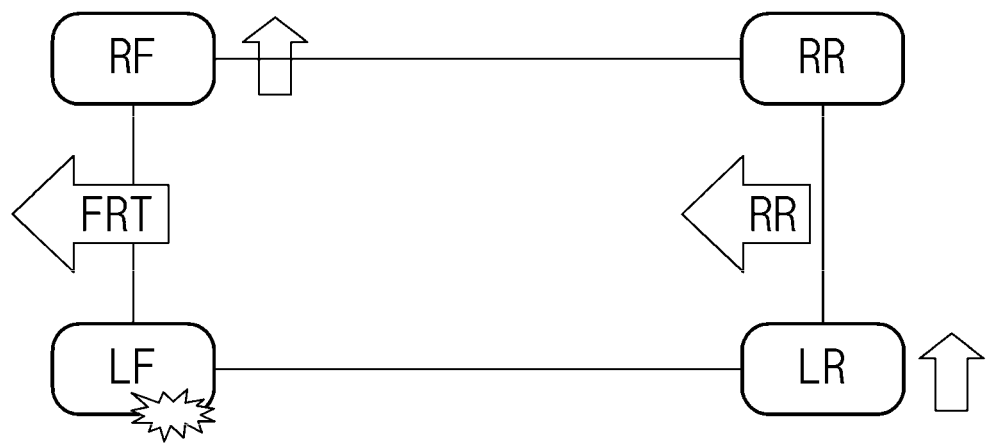

FIGS. 3 and 4 are diagrams describing a scheme of controlling the height of a vehicle body depending on the position of a tire in which an error occurs.

The controller 200 controls the height of the air spring 310 provided in each wheel in the air suspension system 1 to facilitate a replacing or repairing operation of the tire in which the error occurs.

FIG. 3 illustrates a case in which an error occurs in a left rear tire LR. In this case, the controller 200 raises the air springs 310 of a left front tire LF and a right rear tire RR adjacent to the left rear tire LR to a maximum height. Therefore, a vehicle height at the left rear tire LR in which the error occurs increases to facilitate the replacing or repairing operation of the tire.

FIG. 4 illustrates a case in which an error occurs in the left front tire LF. In this case, the controller 200 raises the air springs 310 of a right front tire RF and a left rear tire LR adjacent to the left front tire LF to the maximum height. Therefore, a vehicle height at the left front tire LF in which the error occurs increases to facilitate the replacing or repairing operation of the tire.

In a real vehicle simulation, when a tire pressure under a normal condition is 30 psi and a tire pressure under an abnormal condition is 2 psi or less, the vehicle height at the left rear tire LR in which the error occurs decreases from 175 mm to 150 mm in the case of FIG. 3. In this case, when the air spring 310 adjacent to the left rear tire LR is each raised by 30 mm, the vehicle height at the left rear tire LR increases from 150 mm to 175 mm.

In FIG. 4, the vehicle height at the left front tire LF in which the error occurs decreases from 170 mm to 130 mm. In this case, when the air spring 310 adjacent to the left front tire LF is each raised by 30 mm, the vehicle height at the left front tire LF increases from 130 mm to 160 mm.

Meanwhile, an execution condition should be satisfied so as for the controller 200 to increase the vehicle height by controlling the height of the air spring 310. This is to control the vehicle height at the time when the replacing or repairing operation is performed because a larger risk may occur when a vehicle height is controlled immediately after the error is sensed.

As a result, the controller 200 judges whether a vehicle stopping state is continued for a predetermined time after the error is sensed in the tire as a condition for controlling the vehicle height. That is, the controller 200 judges that the replacing operation of the tire in which the error occurs is started if the vehicle stopping state is continued for a predetermined time, for example, two minutes or more from the vehicle speed sensor 10 to control the vehicle height.

Alternatively the controller 200 may control the vehicle height when an execution signal is input by an operation by a driver after the error is sensed in the tire. For example, when the driver presses a leveling switch 20 provided in the vehicle, the controller 200 may start controlling the vehicle height by recognizing the signal.

As described above, the air suspension system 1 of the present invention may facilitate the replacing or repairing operation by controlling the height of the air spring 310 when the replacement or repairing is required due to occurrence of errors such as the puncture, and the like in the tire of the vehicle.

Meanwhile, hereinafter, a control method of an air suspension system according to another exemplary embodiment of the present invention will be described below with reference to the accompanying drawings. However, the same parts as described in the air suspension system 1 according to the exemplary embodiment of the present invention will not be described.

Figure 2:
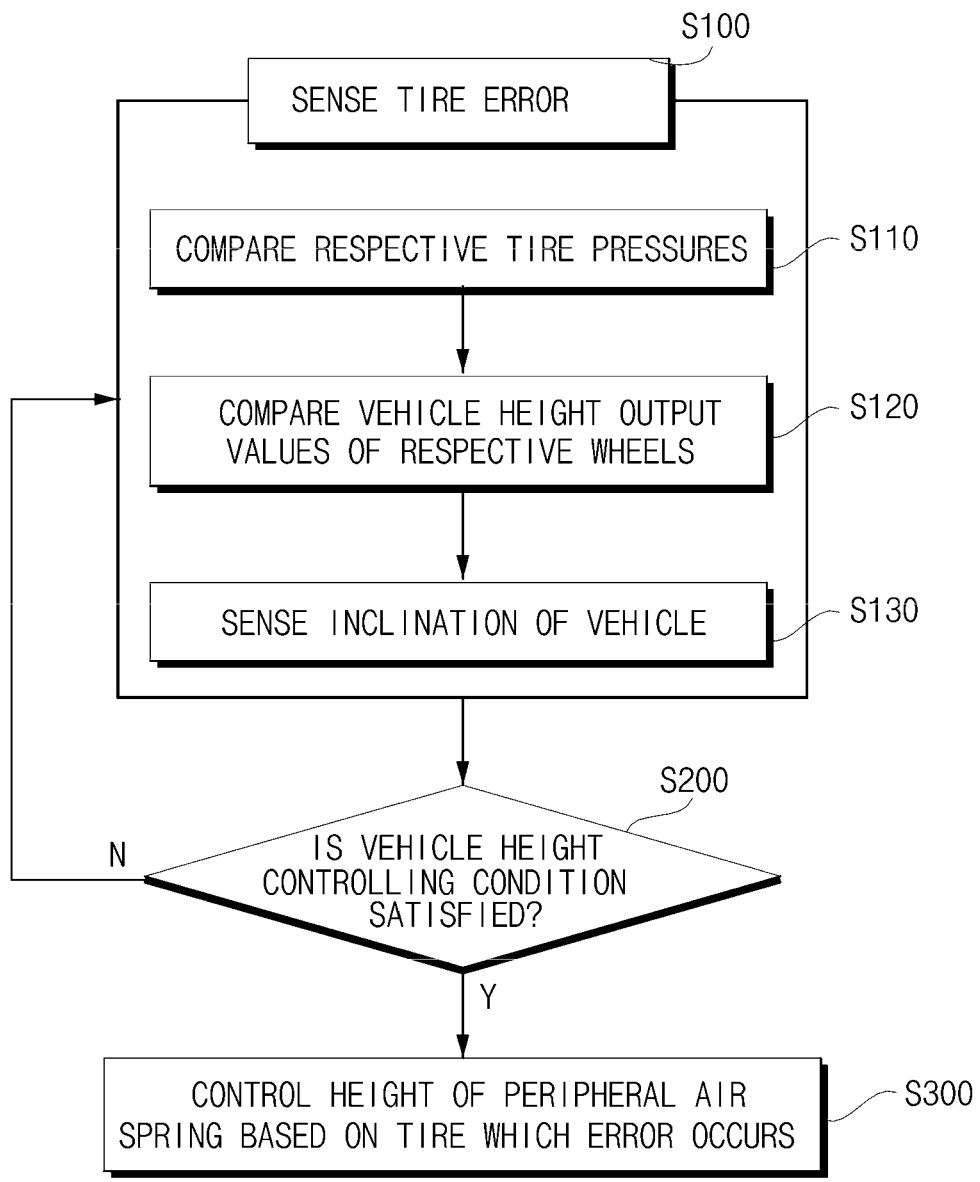
FIG. 2 is a flowchart of a control method of an air suspension system according to another exemplary embodiment of the present invention.

FIG. 2 is a flowchart of a control method of an air suspension system according to another exemplary embodiment of the present invention.

Referring to FIG. 2, the control method of the air suspension system according to the exemplary embodiment of the present invention includes sensing an error of a tire (S100), judging a condition for controlling a vehicle height (S200), and controlling the height of a peripheral air spring 310 based on the tire in which the error occurs (S300).

The sensing of the error of the tire (S100) includes comparing respective tire pressures (S110), comparing vehicle height output values of respective wheels (S120), and sensing an inclination of a vehicle (S130).

In this case, where there is no tire pressure measurement system (TPMS), the tire error may be sensed only by the comparing of the vehicle height output values of the respective wheels (S120) and the sensing of the inclination of the vehicle (S130).

In the judging of the condition for controlling the vehicle height (S200), it is judged whether a vehicle stopping state is continued for a predetermined time or it is judged whether an execution signal by an operation by a driver is input. When one of two conditions is satisfied, the vehicle height controlling step (S300) which is the next step is performed.

In the controlling of the height of the peripheral air spring 310 based on the tire in which the error occurs (S300), the heights of air springs 310 provided in two neighboring tires other than a diagonal tire based on the tire in which the error occurs are increased. Therefore, the vehicle height at the tire in which the error occurs is increased to facilitate the replacing or repairing operation.

As described above, the control method of the air suspension system of the present invention may facilitate the replacing or repairing operation by controlling the height of the air spring 310 when the replacement or repairing is required due to occurrence of errors such as the puncture, and the like in the tire of the vehicle.

In the exemplary embodiments, the vehicle height is controlled so as to facilitate the replacing or repairing operation of the tire by sensing the case in which the error occurs in the tire, but the scope of the present invention is not be limited thereto and the technology of the present invention may be applied to a case in which an error occurs in the air spring 310 in a vehicle with the air suspension system 1.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A control method of an air suspension system, comprising:
    generating a signal indicative of an error of a first tire or a first air spring; and
    increasing heights of second and third air springs associated with second and third tires, respectively, the second and third tires being adjacent to the first tire or the first air spring, to adjust a vehicle height at the first tire or the first air spring based on the signal.

2. The method of claim 1, further comprising comparing pressures of respective tires or air springs, wherein the tires include the first, second, and third tires and the air springs include the first, second, and third air springs.

3. The method of claim 1, further comprising:
    comparing vehicle height output values of respective wheels; and
    measuring an inclination of a vehicle.

4. The method of claim 1, further comprising:
    after generating the signal of the error of the first tire or the first air spring, determining whether a condition for adjusting the vehicle height is satisfied.

5. The method of claim 4, wherein the condition for adjusting the vehicle height is satisfied when a vehicle continues to stop for a predetermined time after the signal is generated.

6. The method of claim 5, wherein the predetermined time is 2 minutes.

7. The method of claim 4, wherein the condition for adjusting the vehicle height is satisfied when an execution signal is input after the signal is generated.

8. The air suspension system of claim 1, wherein the second tire is disposed adjacent to the first tire in a longitudinal direction of a vehicle and the third tire is disposed adjacent to the first tire in a direction perpendicular to the longitudinal direction of the vehicle.

9. The method of claim 1, wherein each of the heights of the second and third air springs associated with the second and third tires is increased to a maximum height.

10. An air suspension system, comprising:
    a sensor generating a signal indicative of an error of a first tire; and
    a controller increasing heights of second and third air springs associated with second and third tires, respectively, the second and third tires being adjacent to the first tire, to adjust a vehicle height at the first tire based on the signal.

11. The air suspension system of claim 10, wherein the sensor includes a tire pressure measurement system (TPMS) sensor measuring a tire pressure.

12. The air suspension system of claim 10, wherein the sensor includes:
    a vehicle height sensor associated with each wheel to measure a corresponding vehicle height; and
    a G sensor measuring an inclination of a vehicle.

13. The air suspension system of claim 10, wherein the controller adjusts the vehicle height at the first tire when a vehicle continues to stop for a predetermined time after the signal is generated.

14. The air suspension system of claim 13, wherein the predetermined time is 2 minutes.

15. The air suspension system of claim 10, wherein the controller adjusts the vehicle height at the first tire when an execution signal is input after the signal generated.

16. The method of claim 10, wherein the second tire is disposed adjacent to the first tire in a longitudinal direction of a vehicle and the third tire is disposed adjacent to the first tire in a direction perpendicular to the longitudinal direction of the vehicle.

17. The air suspension system of claim 10, wherein the controller increases each of the heights of the second and third air springs associated with the second and third tires to a maximum height.

* * * * *